United States Patent Office 2,713,020
Patented July 12, 1955

2,713,020

REPOSITORY BISMUTH SUBSALICYLATE

Frank Harold Buckwalter, De Witt, N. Y., assignor to Bristol Laboratories Inc., Syracuse, N. Y., a corporation of New York No Drawing. Application October 21, 1953,
Serial No. 387,549

7 Claims. (Cl. 167—68)

This invention relates to repository or depot drug compositions and more particularly to repository compositions of bismuth subsalicylate incorporated in an injectable oil that has been gelled by a metal salt of a fatty acid.

This application is a continuation-in-part of my prior, co-pending application U. S. Serial No. 180,307, filed August 18, 1950, and now abandoned, which in turn was a continuation-in-part of my prior, co-pending application U. S. Serial No. 819, filed January 6, 1948, and now abandoned.

A repository composition as referred to herein is a composition containing a therapeutic substance for parenteral injection which prevents the rapid absorption of the therapeutic substance in the blood stream, thus acting as a continuous source of the drug and eliminating the necessity for frequent injections.

Bismuth subsalicylate is the most commonly employed bismuth salt in syphilotherapy.

Heretofore, peanut oil has been the common vehicle used for the parenteral injection of bismuth subsalicylate. The drug is absorbed slowly from the peanut oil and effective blood levels are maintained for a fairly satisfactory period. However, this preparation presents a decided disadvantage in that the bismuth subsalicylate settles out of the peanut oil, and it is almost impossible to resuspend the drug after it has stood for any length of time. It is obvious that this inferior shelf life represents a serious commercial problem as well as a great inconvenience to the physician who must spend his time and energy trying to resuspend the drug in the oil and even then cannot be assured that the patient will receive a uniform dosage.

I have discovered that when bismuth subsalicylate is suspended in an injectable oil that has been gelled by the addition of a metal salt of a fatty acid the settling is negligible and even after standing for as long as 18 months at room temperature, the bismuth subsalicylate can be quickly and uniformly resuspended with a few shakes.

This new composition also insures that therapeutic blood levels of the drug will be maintained for a period longer than previously known compositions. These new compositions are fluid and not unduly viscous, and are readily injected through a hypodermic needle, even one of small size.

The repository bismuth subsalicylate compositions of my invention are dispersions that have the appearance of a solid viscous gel. When disturbed or shaken, however, the composition becomes much more fluid and runs as a liquid having a viscosity between 230 and 500 centipoises at a temperature of about 25° C. as determined by the Stormer viscosimeter. The composition may be referred to properly as a thixotropic gel suspension and it can readily be pulled up through a needle of a hypodermic syringe and discharged therefrom with even greater facility. Although more viscous and rigid gel compositions are contemplated in the broader aspects of my invention, these compositions are nonetheless capable of use in "one-shot" syringe equipment in which the composition is dispensed in a compact syringe unit.

The repository bismuth subsalicylate compositions of my invention may be obtained in the form of thixotropic gels, which, after shaking or stirring flow as liquids but set again to gels on standing. The compositions are substantially anhydrous. On adding small amounts of water to the compositions, the gel thickens and loses some of its thixotropic properties; further amounts of water produce a separation of the composition into an aqueous phase and a viscous oily or waxy solid. Accordingly, it is advisable in using the compositions to keep them dry and to avoid adding water to them or bringing them into contact with water, or in water-washed but undried syringes, although substantial proportions of water are normally necessary to affect the composition greatly and render it unusable or difficult to dispense.

The gel or vehicle portion of the repository composition of my invention is produced from peanut oil or an ester of a fatty acid having 12 or more carbon atoms in the molecule. Ethyl oleate is eminently suitable, as are esters of alcohol such as methyl, ethyl, propyl, butyl, glycol, and glycerol with long-chain saturated and unsaturated monocarboxylic acids having 12 to 22 carbon atoms, inclusive. Esters of hydroxy-substituted acids of this group, for example, castor oil, are less suitable than the simple unsubstituted acids. The preferred esters are the fatty oils which are readily saponifiable and which are non-drying; such preferred oils are peanut, sesame, soybean, cottonseed, and corn. Other saponifiable esters, not included in this group which are also suitable, are isoamyl salicylate, dibuty sebacate and ethyl-alpha-phenylbutyrate. The preferred esters are normally liquid, hence beeswax, which is predominantly myricyl palmitate (myricin), the palmitic acid myricyl alcohol ($C_{30}H_{61}OH$), is not a suitable ester. The esters specified herein include the normal dodecanoic (lauric), tridecanoic, tetradecanoic (myristic), pentadecanoic, hexadecanoic (palmitic), heptadecanoic (margaric), octadecanoic (stearic), nonadecanoic, eicosanoic (arachidic), heneicosanoic, and decasanoic (behenic) acids as well as their branched-chain isomers and corresponding unsaturated acids, including palmitoleic, oleic, ricinoleic, petrosalinic, vaccenic, linolenic, oleostearic, licanic, parinaric, gadoleic, arachidonic, cetoleic and crucic acids. Mixtures of esters, such as occur in natural oils and fats, are included within the scope of this invention.

Peanut oil or other suitable ester, as referred to herein, is transformed to a gel before incorporating the bismuth subsalicylate. This gelling is effected by treatment of the oil with a small proportion of a salt or soap of aluminum and a fatty acid, for example, an aluminum stearate. Commercial grades of aluminum stearate are suitable and their designations as aluminum monostearate, aluminum distearate and aluminum tristearate, relate more particularly to their content of aluminum rather than to their actual compositions. All three of the purest aluminum stearates referred to are soaps and are generally non-crystalline and probably have similar or identical components which conform to the general theoretical formula $$-Al(OH)_n(C_{17}H_{35}COO)_{3-n}$$

I prefer to use the products designated as aluminum monostearate and alumium distearate although the aluminum tristearate is also usable. These aluminum stearates are well known articles of commerce and their preparation has been described.

The germanium or zirconium salts of fatty acids may be used in place of the aluminum salts for gelling the esters; however, the corresponding calcium, barium, magnesium, zinc, strontium, sodium and potassium salts or soaps do not produce gels which possess the desired repository effects.

The preferred salts for the gelling of the ester are aluminum salts of fatty acids and I prefer to use aluminum salts of the same or similar fatty acids as those of the ester. Thus, in gelling the glycerol ester of lauric acid, I prefer to use aluminum laurate instead of aluminum stearate, although satisfactory compositions are produced where aluminum stearate is used for gelling peanut oil. It is not necessary that the acid of the aluminum salt have more than 12 carbon atoms, since there may be an acid interchange with the oil and the result will not be substantially different from that obtained by the use of the specified salts.

The amount of aluminum or other gelling agent which is used should be approximately within the range of 1 to 10% and preferably within the range of 1 to 3% of the oil or ester. These percentages, as well as all other percentages with reference to this particular phase of my invention, represent parts by weight of the gelling agent to parts by volume of the oil or ester; the abbreviations "% (w./v.)" or "percent (w./v.)" are used. A gel formed by gelling peanut oil with 2% (w./v.) of aluminum stearate is the preferred material for the compositions of this invention. It is desirable to use as little of the metal salt or soap as possible since such materials may slow down the subsequent absorption of the composition in the body after all the therapeutic agent has been absorbed.

To gel the oil or ester, the oil is heated with the gelling agent, preferably with stirring, to a suitable temperature, which may vary somewhat with different esters and proportions or materials but which will generally be below 150 degrees centigrade. Peanut oil can be readily gelled by heating it with 2% (w./v.) of aluminum monostearate to approximately 118 to 135 degrees centigrade, at which point the suspension or dispersion becomes clear. To prevent fusion or agglomeration of the aluminum stearate particles, the aluminum stearate is added below approximately 80 degrees centigrade and preferably at the start at room temperature. The entire batch is kept well-stirred during the heating, which may be at the rate of approximately 2 to 3 degrees per minute. There is little danger in overheating, provided decomposition of the oil is not engendered; the characteristics of the gel are not substantially affected by heating for longer periods or to higher temperatures. Other methods are not as easily performed and controlled as this simple heating step.

After the ester has been gelled, it is cooled, and the bismuth subsalicylate is added in powdered form with stirring. Generally, 0.130 gram in one milliliter of the repository composition is a satisfactory concentration, but compositions containing from .05 gram to .2 gram per milliliter are included in this invention.

Although the above stated therapeutically active repository compositions will achieve the objects specified, the composition may contain other ingredients, namely, other drugs, wetting agents, hygroscopic salts, etc.

The following examples will serve to illustrate the invention without limiting it thereto.

Example I

To 100 cc. of peanut oil is added 2% (w./v.) of powdered commercial almuminum monostearate and the mixture is heated slowly with stirring at the rate of about 2 to 3 degrees centigrade per minute until the mixture clears. The temperature at this point will be approximately 120 degrees centigrade. The heating is continued slowly until the temperature reaches 135 degrees to insure that the aluminum stearate has been completely incorporated and will not separate out upon cooling. The material is then cooled to the room temperature.

To 13.0 grams of micronized bismuth subsalicylate was added 3.0 grams of chlorobutanol and the whole incorporated in the gel with stirring. The composition was put in 20 cc. vials, capped and sterilized for one hour at 100 degrees centigrade.

Example II

To 100 cc. of peanut oil is added 1% (w./v.) of powdered commercial aluminum monostearate and the mixture is heated slowly with stirring at the rate of about 2 to 3 degrees centigrade per minute until the mixture clears. The temperature at this point will be approximately 120 degrees centigrade. The heating is continued slowly until the temperature reaches 135 degrees to insure that the aluminum stearate has been completely incorporated and will not separate out upon cooling. The material is then cooled to the room temperature.

To 13.0 grams of micronized bismuth subsalicylate was added 3.0 grams of chlorobutanol and the whole incorporated in the gel with stirring. The composition was put in 20 cc. vials, capped and sterilized for one hour at 100 degrees centigrade.

Example III

To 100 cc. of ethyl oleate is added 1% (w./v.) of powdered commercial aluminum monostearate and the mixture is heated slowly with stirring at the rate of about 2 to 3 degrees centigrade per minute until the mixture clears. The temperature at this point will be approximately 120 degrees centigrade. The heating is continued slowly until the temperature reaches 135 degrees to insure that the aluminum stearate has been completely incorporated and will not separate out upon cooling. The material is then cooled to the room temperature.

To 13.0 grams of micronized bismuth subsalicylate was added 3.0 grams of chlorobutanol and the whole incorporated in the gel with stirring. The composition was put in 20 cc. vials, capped and sterilized for one hour at 100 degrees centigrade.

Example IV

Twenty grams of aluminum monostearate, 1000 cc. of peanut oil, and 5 grams of chlorobutanol were autoclaved separately for 20 minutes at 15 lbs. pressure. The aluminum monostearate was then added to the peanut oil with stirring and heated to 115°–120° until stringy and allowed to set overnight.

One hundred thirty grams of bismuth subsalicylate was sterilized by treating it with formaldehyde vapors for 24 hours. It was then added with stirring to the gel, put through a colloid mill several times and placed in 20 cc. vials.

The gel appeared to be very white and smooth and on shaking became quite fluid.

Clinical results in 29 patients given injections of 0.5–2.0 cc. of bismuth subsalicylate ( about 0.13 g./cc.) in peanut oil gelled with aluminum monostearate are summarized in the following table:

| Diagnosis | Previous Duration of Disease | Total Number of Injections | Final Status of Patient | Intolerance |
|---|---|---|---|---|
| Lupus Erythematosus Seborrheic Dermatitis, Lichen Planus (?). | 3-4 weeks | 12 | somewhat improved | none. |
| Lichen Planus | 2 mos | 12 | improved | Do. |
| Seb. Keratoses, Verr. Vulgaris | 3-4 mos | 4 | -----do | Do. |
| Verrucae Vulgaris | 6 mos | 10 | -----do | Do. |
| Do | 3-4 mos | 2 | -----do | Do. |
| Verrucae | 6 mos | 4 | -----do | Do. |
| Verrucae (?) mosaic | 6 mos | 6 | -----do | Do. |
| Licen Planus | | 6 | -----do | Do. |
| Do | 3 weeks | 8 | -----do | Do. |
| Lichen Planus, Herpex Simplex | | 2 | no change | Do. |
| Lupus Erythematosus, Poikiloderma of Civatte, Seb. Dermatitis (Scalp) Chronic Discoid. | 4 years | 8 | slight improvement | Do. |
| Lupus Erythematosus, Lymphocytoma | 2 years | 1 | no change | Do. |
| Verrucae Vulgaris | 1 year | 2 | improved | Do. |
| Verrucae | 2 mos | 3 | slight improvement | Do. |
| Verrucae Plantaris | 6 mos | 2 | ? | Do. |
| Do | 8 mos | 1 | ? | Do. |
| Do | 3 years | 1 | Not much improvement | Do. |
| Do | 6 mos | 6 | improved | Do. |
| Verrucae Vulgaris, Plantar Wart and Mosaic Wart foot, Seborrheic Dermatitis. | 4 years | 6 | -----do | Do. |
| Verrucae Vulgaris | 3 mos | 3 | ? | Do. |
| Do | 3-4 years | 5 | ? | Do. |
| Verrucae Vulgaris Plant. | 4-5 years | 12 | improved | Do. |
| Verrucae Plantaris, mosaic | many years | 1 | moderate improvement | Do. |
| Verrucae Vulgaris, Seb. Dermatitis, Acne Vulgaris. | 2 years | 1 | improved | Do. |
| Verrucae Vulgaris | 9 mos | 2 | -----do | Do. |
| Verrucae Plantaris | 4 mos | 2 | -----do | Do. |
| Verrucae Vulgaris | 3 years | 6 | -----do | Do. |
| Do | 2 years | 1 | -----do | Do. |
| Do | 4-5 years | 3 | -----do | Do. |

The product of the present invention has thus been demonstrated to be a unique form of bismuth which is better tolerated than previously employed bismuth preparations and which is of satisfactory clinical efficacy.

The product of the present invention can be easily suspended with a few shakes after as long a period of storage as 18 months at room temperature, whereas bismuth subsalicylate in oil alone after about 6 months' storage at room temperature becomes almost impossible to resuspend.

Inasmuch as the foregoing specification comprises preferred embodiments of the invention, it is to be understood that variations and modifications may be made in accordance with the principles disclosed, without departing from the scope of the invention, which is limited solely by the appended claims.

I claim:

1. A therapeutic preparation comprising bismuth subsalicylate dispersed in a vehicle comprising an injectable oil having dispersed therein a quantity of a fatty acid salt of a metal selected from the group consisting of aluminum, zirconium, and germanium sufficient to prevent permanent settling of the bismuth subsalicylate after standing over long periods of time, said fatty acid being selected from a group consisting of long chain saturated and unsaturated monocarboxylic acids having from 12 to 22 carbon atoms inclusive.

2. A therapeutic preparation comprising bismuth subsalicylate dispersed in a vehicle comprising an injectable oil having dispersed therein a quantity of an aluminum salt of a fatty acid selected from a group consisting of long chain saturated and unsaturated monocarboxylic acids having from 12 to 22 carbon atoms, inclusive, in the molecule, sufficient to prevent permanent settling of the bismuth subsalicylate after standing over long periods of time.

3. A therapeutic preparation comprising bismuth subsalicylate dispersed in a vehicle comprising an injectable oil having dispersed therein a quantity of an aluminum stearate sufficient to prevent permanent settling out of the bismuth subsalicylate after standing over long periods of time.

4. A therapeutic preparation as set forth in claim 3, characterized in that said injectable oil is a non-drying saponifiable oil which is normally liquid and the quantity of an aluminum stearate dispersed in said injectable oil is within the range of from approximately 0.1 to approximately 10 percent based upon parts by weight of said stearate to parts by volume of said oil.

5. A therapeutic preparation as set forth in claim 3, characterized in that said injectable oil is a non-drying saponifiable oil which is normally liquid and the quantity of an aluminum stearate dispersed in said injectable oil is within the range of from 1 to 3 percent based upon parts by weight of said stearate to parts by volume of said oil.

6. A therapeutic preparation comprising bismuth subsalicylate dispersed in a vehicle comprising peanut oil having dispersed therein 5 percent of aluminum monostearate based upon parts by weight of said stearate to parts by volume of said oil, said aluminum monostearate being effective to prevent permanent settling of the bismuth subsalicylate after standing over long periods of time.

7. A therapeutic preparation comprising bismuth subsalicylate dispersed in a vehicle comprising peanut oil having dispersed therein 2 percent of aluminum monostearate based upon parts by weight of said stearate to parts by volume of said oil, said aluminum monostearate being effective to prevent permanent settling of the bismuth subsalicylate after standing over long periods of time.

References Cited in the file of this patent

UNITED STATES PATENTS

| | | |
|---|---|---|
| 1,926,745 | Klopfer | Sept. 12, 1933 |
| 2,055,083 | Klein | Sept. 22, 1936 |
| 2,163,588 | Cornish | Sept. 27, 1939 |
| 2,240,036 | Christiansen | Apr. 29, 1941 |
| 2,364,151 | McCarthy | Dec. 5, 1944 |
| 2,507,193 | Buckwalter | May 9, 1950 |

OTHER REFERENCES

Kampmeier Bimonthly Progress Report No. 1, March 15, 1945, OEMCMR 505.